PULSE CODE MODULATION ENCODING AND DECODING APPARATUS

Filed Aug. 6, 1963 3 Sheets-Sheet 1

INVENTOR.
EDMUND R. ALTONJI
BY Alfred C. Hill
AGENT

PULSE CODE MODULATION ENCODING AND DECODING APPARATUS

Filed Aug. 6, 1963 3 Sheets-Sheet 2

INVENTOR.
EDMUND R. ALTONJI
BY Alfred C. Hill
AGENT

PULSE CODE MODULATION ENCODING AND DECODING APPARATUS

Filed Aug. 6, 1963 3 Sheets-Sheet 3

INVENTOR.
EDMUND R. ALTONJI
BY Alfred C. Hill
AGENT

3,320,534
PULSE CODE MODULATION ENCODING AND DECODING APPARATUS

Edmund R. Altonji, Pequannock, N.J., assignor to International Telephone and Telegraph Corporation, Nutley, N.J., a corporation of Maryland
Filed Aug. 6, 1963, Ser. No. 300,382
20 Claims. (Cl. 325—38)

This invention relates to communication systems and especially to pulse code modulation encoding and decoding apparatus for use with such systems. It is occasionally advantageous to exchange bandwidth for dynamic range in pulse code modulation systems, particularly those using microwave relays or those requiring high density recording of time multiplex signals.

It is accordingly one of the objects of the invention to provide pulse code modulation encoding and decoding apparatus which is simple and inexpensive in construction and utilizes well known electronic circuits.

Another object of the invention is to provide encoding apparatus for translating pulse amplitude modulated signals into pulse code modulated signals and decoding apparatus for translating the pulse code modulated signals into amplitude modulated signals.

Another object of the invention is to provide encoding and decoding apparatus as in the above paragraph which will require only sufficient bandwidth to carry the pulse code modulated signals regardless of harmonics generated by the translation from amplitude to pulse code modulation.

Other objects will be apparent as the description of the invention proceeds.

One embodiment of the invention is illustrated in the accompanying drawings, in which.

Figure 1:
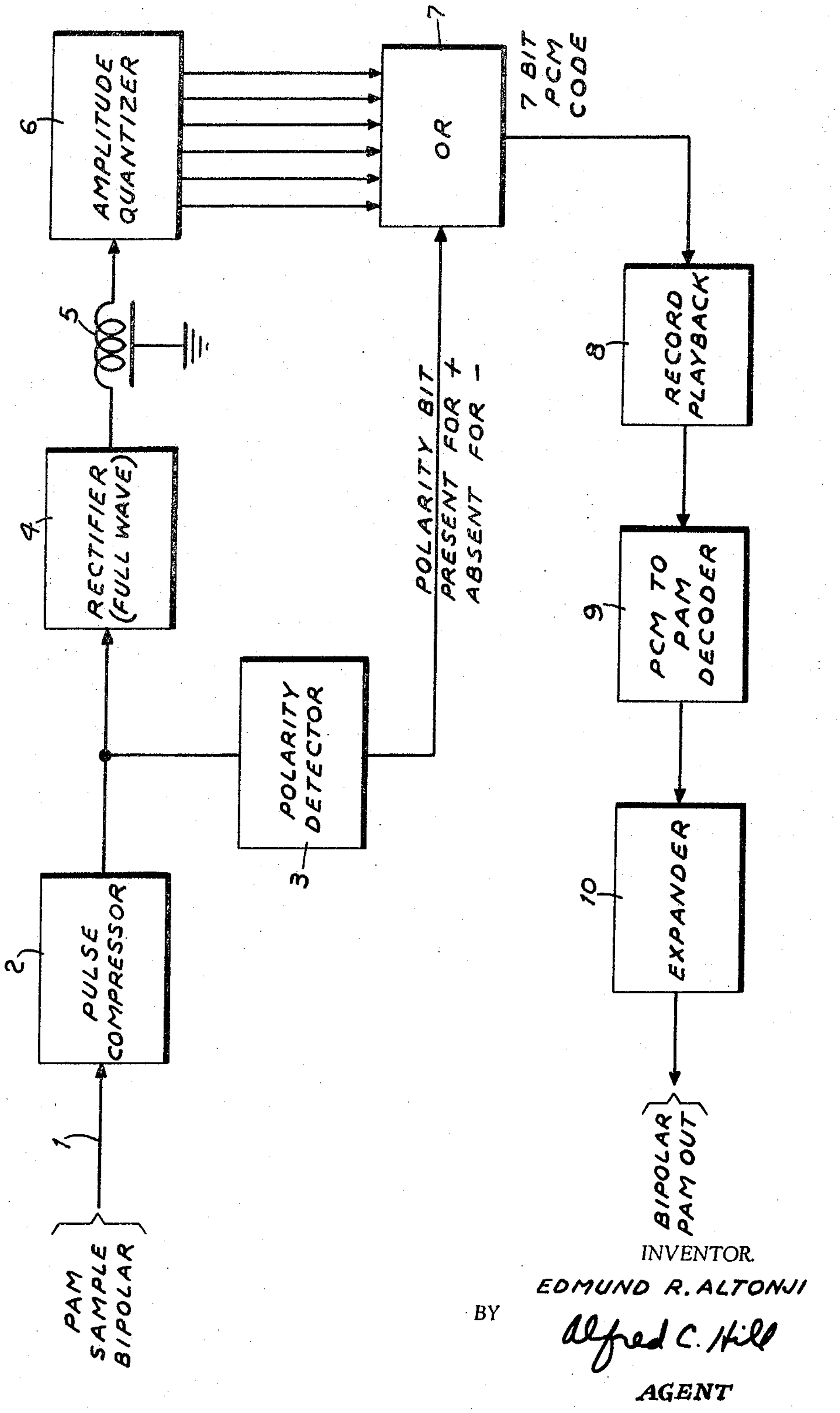
FIGURE 1 is a block diagram of a complete system using the encoding and decoding apparatus of the invention.

Referring to FIGURE 1, by means of the apparatus of the invention, each pulse of a bipolar amplitude modulated signal is received over an input 1 and compressed by means of the pulse compressor 2 prior to encoding in order to obtain an increase in dynamic range. At the same time the polarity is detected by a polarity detector 3 connected to the output of the pulse compressor, and a polarity bit is produced if the signal is of one polarity, while no polarity bit is produced if the signal is of the other polarity. The compressed signal is then rectified by means of the full wave rectifier 4 and, after a slight delay in a delay circuit 5, is quantized by the amplitude quantizer 6 into a combination of six code bits, each code bit representing a different potential value. The polarity detector 3 and the quantizer 6 feed into an OR gate 7. Thus a sequence of seven bits is produced by the OR gate: a polarity bit, followed by a sequence of six time positioned code bits. The polarity bit may or may not be present, depending on the polarity of the amplitude modulated pulse, and only a combination of the other six bits will be present depending on the amplitude of the signal.

This sequence of time positioned bits of the pulse code may then be manipulated in any desired manner. For example, it may be recorded in any suitable type of recording apparatus, or it may be transmitted to a distant point over a suitable transmitting channel, after which it is decoded. What happens to the signal between the encoding and the decoding is not important to the invention, and I have used the expression intervening medium in the claims to designate whatever apparatus exists between the encoding and decoding apparatus.

For the purpose of explaining the invention, I have indicated a recording apparatus 8 of any desired type which would be provided with a recording head and a reproducing or playback head. The seven bit pulse-code-modulated signal is duly recorded in the apparatus 8, and when it is reproduced, it is fed into the decoder 9 which translates it from code modulated pulses to amplitude modulated pulses.

These pulses are then fed into the expander 10 which expands them to the same degree that they were compressed in the first place. It is essential that the expansion process, after playback, completely restore the signal to its original form. This is accomplished in the expander by the generation of harmonics equal and opposite in phase to those harmonics which were generated by the pulse compressor. Since the degree of compression is known, the degree of expansion may be determined, and by reasonable care in design, the compressor and expander can be made to have equal characteristics.

Figure 2:
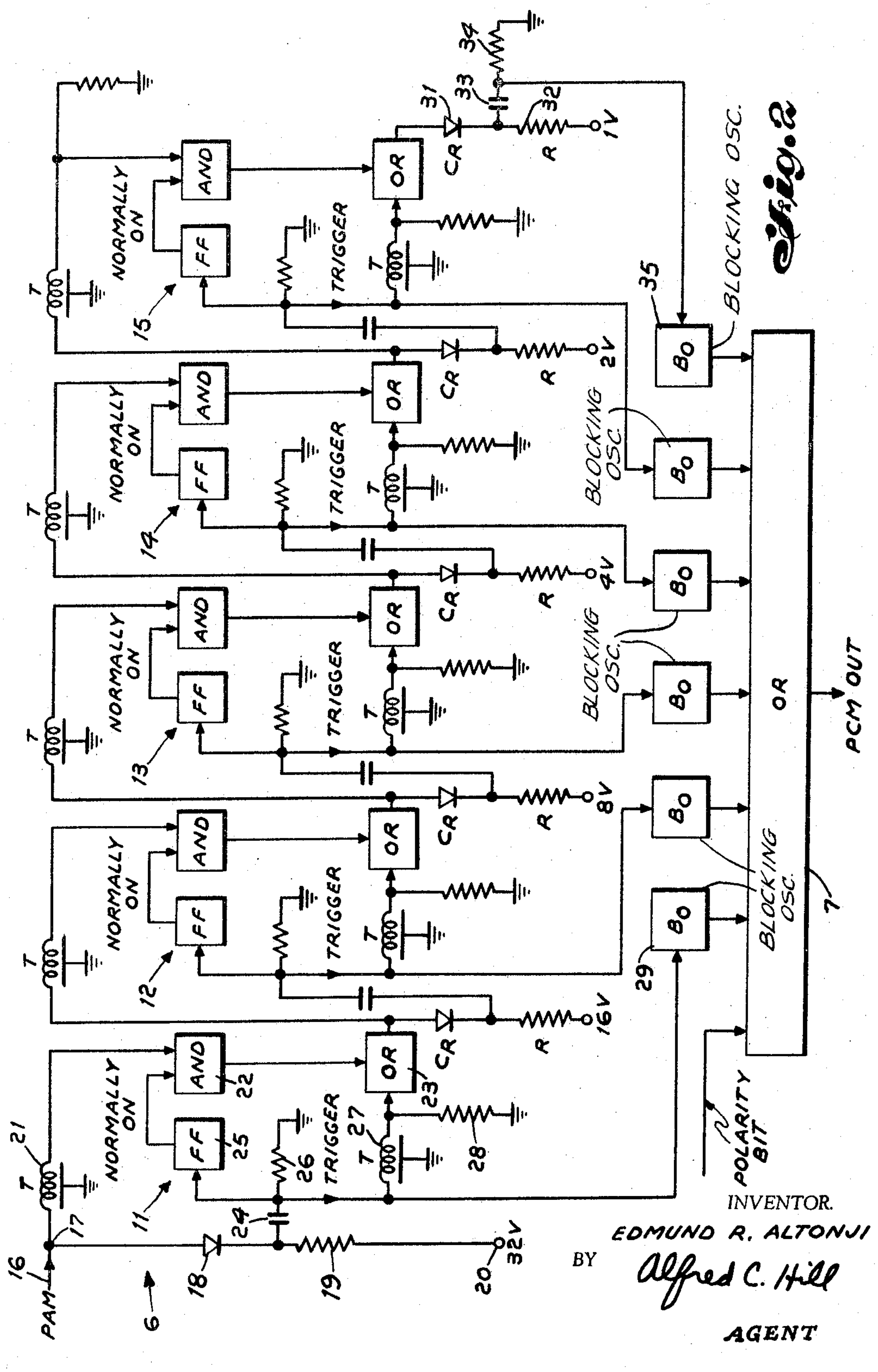
FIGURE 2 is a schematic functional diagram of one form of encoding apparatus which may be used with the invention.

One form of quantizer which may be used with the invention is shown in FIGURE 2. For purposes of illustration, this quantizer produces six time position slots from a single input pulse, the combination of slots occupied by code bits being determined by the amplitude of the input pulse. In order to accomplish this, five stages of quantizing circuits, 11, 12, 13, 14, and 15, are provided, each stage feeding into the next. Since these stages are identical, only stage 11 will be described in detail.

The compressed and rectified amplitude modulated pulse from the delay circuit 5 is received by the encoding circuit over conductor 16 which is connected to the input 17 of the circuit 11. The input 17 connected to a potential comparing circuit comprising a diode 18 in series with a resistor 19 which, in turn, is connected to a source of potential indicated at 20. The diode is poled so that when the input potential is above that of the source 20, current can flow towards the source. If the input potential, however, is below that of the source 20, no current can flow through the diode and resistor.

A delay circuit 21 is also connected to the input 17 and thus receives the input pulse. This delay circuit has a delay equal to the time duration of one time slot, so that the incoming pulse, after a delay of one time slot, will be fed to one input of an AND gate 22, the output of which passes through an OR gate 23 and is delivered to the input of the next stage, 12.

The juncture of the diode 18 and resistor 19 is connected through a coupling capacitor 24 to the input of a monostable multivibrator flip-flop circuit 25 which may be shifted to its unstable condition when a pulse of sufficient potential is applied to its input. The output of this circuit is arranged to be energized when the multivibrator is in its stable condition, or, in other words, when no pulse is delivered to its input. The output is connected to a second input of the AND gate 22 which is therefore normally enabled to pass a pulse from the delay circuit 21. When the monostable multivibrator is shifted to its unstable condition, the second input to the AND gate 22 is deenergized and the pulse from the delay circuit 21 cannot get through.

The juncture of the capacitor 24 and the multivibrator 25 is also connected to ground through a resistor 26 and to the input of a second delay circuit 27 which has the same delay as that of the circuit 21. The output of this delay circuit is connected to ground through a resistor 28 and to another input of the OR gate 23.

The sources of potential for the different stages corresponding to the source 20 are arranged in a descending scale to give the different potential values for the code bits appearing in the time slots. Thus source 20 for the first stage 12 may be given a value of 32 volts to represent 32 levels, while the succeeding sources have values of 16, 8, 4, 2, and 1, respectively.

A blocking oscillator 29 is also connected to the coupling capacitor 24 and is arranged to be triggered if a pulse is transmitted over the coupling capacitor from the comparing circuit. The output of this blocking oscillator is connected to one input of the OR gate 7 which is common to all the stages.

If the pulse received over the input 17 is greater than 32 volts, current will flow through the comparing circuit 18–19 and a pulse having a potential equal to the difference of the input potential above 32 volts will pass through the coupling capacitor 24. This pulse will shift the monostable multivibrator 25 which, in turn, will deenergize the input of the AND gate 22, so that after the delay of the delay circuit 21, the input pulse cannot pass through the AND gate 22. At the same time this pulse, representing the difference between the potential of the input pulse and the source 20 will pass through the delay circuit 27, and at the end of the delay period will provide a drop in potential across the resistor 28, thus causing a pulse to pass through the OR gate to the input of the second stage 12. Before passing through the delay circuit 27, this pulse will trigger the blocking oscillator 29 to produce a signal representing a code bit in the first slot.

If the potential difference which passes on to the next stage 12 is greater than 16 volts, current will pass through the comparing circuit, corresponding to 18–19 of stage 11, to operate the monostable multivibrator and thus block the upper AND gate, corresponding to gate 22, and the difference over 16 volts will operate the blocking oscillator of that stage to produce a code bit in the second time slot. It will also pass through the lower delay circuit, corresponding to 27 of stage 11, to the input of the next stage.

If the potential difference which passes to stage 12 is below 16 volts, then the diode in stage 12, corresponding to the diode 18 of stage 11, will be blocked, and nothing will pass through the coupling capacitor, so that the monostable multivibrator will not be operated. Thus the AND gate of stage 12, corresponding to AND gate 22 of stage 11 will be enabled and the pulse delayed by the delay circuit, corresponding to the circuit 21 of stage 11, will pass through it to the next stage 13.

From the above it will be seen that a pulse entering any stage of the quantizer will pass through the upper delay circuit and the connected AND gate unless it is higher in potential than the source of the comparing circuit of that stage. If it is higher, then the blocking oscillator of that stage will be triggered and a pulse corresponding to the difference in potential between the input pulse and the source at the comparing circuit will pass through the lower delay circuit to the next stage.

Since each blocking oscillator delivers a potential to the common OR gate 7 at the time slot of the corresponding stage, the output of the OR gate will be a sequence of code bits depending on the number of blocking oscillators which have successively operated.

There are five stages, each with its comparing circuit at the input of the stage, and, in order to provide the sixth time slot, another comparing circuit 31–32 is connected to the output of the OR gate of the stage 15. The juncture between the diode 31 and the resistor 32 is connected over a coupling capacitor 33 and a resistor 34 to ground, while the juncture of the capacitor and resistor is connected to a sixth blocking oscillator 35 whose output is connected to an input of the OR gate 7.

The polarity bit, when present, is also fed into the OR gate 7, but this appears in the first time slot prior to the other six.

Figure 3:
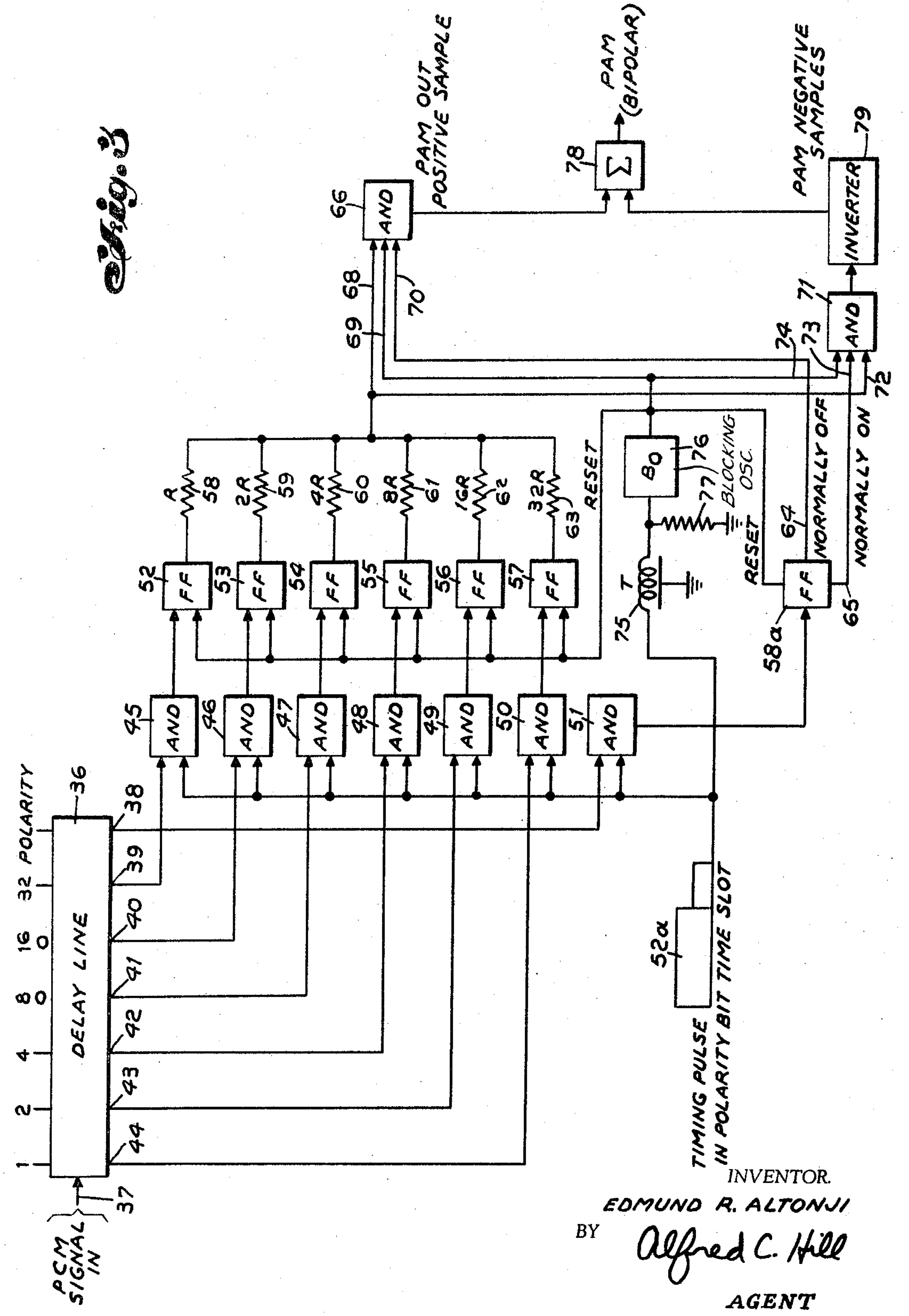
FIGURE 3 is a schematic functional diagram of one form of decoding apparatus which may be used with the invention.

The sequence of a combination of code bits in the seven time slots from the OR gate 7 may then be recorded or transmitted, whereafter this sequence may be decoded by means of the decoding apparatus, illustrated in FIGURE 3.

The decoder of FIGURE 3 comprises a delay line 36 into which the sequence of the coded bits is fed over the input lead 37. This time delay circuit is provided with a plurality of taps, 38 to 44, there being one tap for each time slot, or seven in the example shown. These taps are equally spaced, the time between adjacent taps being equal to the time between adjacent time slots in the incoming signal. Thus, when the bits of the seven time slots have completely entered the delay line, a time slot will be aligned with each tap. Tap 38 will be energized by the polarity bit, if present, and taps 39 to 44 will be energized or not by bits representing 32, 16, 8, 4, 2, and 1 volts respectively.

A plurality of AND gates, 45 to 51, are provided, one for each tap on the delay line. Each of these AND gates has two inputs, one being connected to the corresponding tap on the delay line, and the other being connected to a source 52 of timing pulses which is arranged to produce timing pulses at the time of the polarity bit time slot.

When the timing pulse occurs, each of the seven bits of the incoming signal will be aligned with its corresponding tap on the delay line. Therefore, gates 45 to 51 will be enabled by the timing pulse and will pass the potentials existing at the corresponding taps through the gates. Gates 45 to 51 are provided respectively with storage devices 52 to 58, which, in the example illustrated, are flip-flop circuits with inputs connected to the outputs of the associated gates. Each flip-flop circuit is adapted to shift to a particular one of its stable conditions when a potential is applied to its input from the gate. Accordingly, when signals pass through any of the gates at the time of the timing pulse, the corresponding flip-flop circuits are set, so as to store the values of the bits in the various time slots.

The flip-flop circuits 52 to 57 have their outputs connected respectively to weighting resistors 58 to 63 in order to produce an output pulse for the decoder which will have an amplitude as determined by the coded bits received by the delay line. Thus, the resistor 58 of flip-flop circuit 52, which is set by the first bit received after the polarity bit, will be of such a value that a potential of 32 volts will be produced in the output of the flip-flop; the resistor 60 of flip-flop 54 has a value such that a potential of 8 volts will be produced in the output of the flip-flop; and the resistor 63 of flip-flop 57 has a value such that a potential of 1 volt will be produced in the output of the flip-flop.

The flip-flop circuit 58 which is set by the polarity bit has two outputs, 64 and 65. Output 64 is deenergized when the flip-flop circuit is in its normal condition, while output 65 is energized. When the flip-flop circuit is set by the receipt of a polarity bit, output 64 is energized and output 65 is deenergized. These outputs determine the polarity of the output of the decoder.

A first output AND gate 66 has three inputs, indicated at 68, 69, and 70. Input 68 is connected to the outputs of all the flip-flop circuits 52 to 57, so that a potential appears thereon which is a summation of the potentials on the outputs of all these flip-flop circuits. The input 70 is connected to the output 64 of the flip-flop circuit 58, thus providing that this gate can only be enabled when a polarity bit has been received. The input 70 is used in a manner to be described for enabling the gate at the desired time.

A second output AND gate 71 is also provided with three inputs, 72, 73, and 74. Input 72 is connected to the outputs of all the flip-flop circuits 52 to 57. Input 73 is connected to the output 65 of the flip-flop circuit 58 and is thus enabled when no polarity bit has been received. The input 74 is used to enable the gate at the proper time.

It is desired to open the AND gates 66 and 71 at a sufficient time after the timing pulse has opened the gates 45 to 51 to ensure the setting of the associated flip-flop circuits. To this end the source 52 of timing pulses is connected to a delay circuit 75 whose output is delivered to a blocking oscillator 76. A resistor 77 connected between the delay circuit and ground provides a drop in potential to trigger the blocking oscillator. The output of the blocking oscillator is connected to the inputs 69 and 74, respectively, of the AND gates 66 and 71, and therefore enables these two gates. The blocking oscillator also provides a reset for the flip-flop circuits 53 to 58.

The output AND gate 66 is connected directly to an output circuit 78 for the decoder. The output of the AND gate 71 is connected to the output circuit 78 through an inverter 79.

Assuming that the polarity pulse is produced when the original amplitude modulated pulse is positive, then when a positive amplitude modulated pulse has been encoded by the encoding circuit of FIGURE 2, a polarity pulse will be received when the decoder operates. This will set the flip-flop circuit 58 and the output 64 of that flip-flop circuit will be energized, while the output 65 will not be energized. Thus, upon the operation of the blocking oscillator 76, the output AND gate 66 will open and deliver a pulse of the proper amplitude to the output circuit 78 which will then produce a positive pulse of the proper amplitude.

If the original amplitude pulse was negative, no polarity pulse would have been produced, and when the decoder is operated, the flip-flop circuit 58 will not be set, so that the output AND gate 71 will be enabled but not the AND gate 66. The pulse from the storage flip-flop circuits will then be inverted in the inverter 79 and a negative pulse will be delivered to the output circuit 78 so that a negative pulse of the proper amplitude will be produced by that circuit.

The operation of the blocking oscillator 76 will also reset all the flip-flop circuits to make the decoder circuit ready for the next pulse.

It is possible by adjusting the weighting resistors 58 to 63 to perform the expansion process at this point as an inherent part of the decoding process.

While one embodiment of the invention has been shown and desecribed, many modifications may be made without departing from the spirit thereof, and I do not wish to limit the invention except by the limitations contained in the appended claims.

The embodiments of the invention in which an exclusive property or privilege is claimed are defined as follows:

1. Pulse code modulation encoding and decoding apparatus comprising:

(a) pulse compressing means for receiving and compressing amplitude modulated pulses, (b) rectifying means connected to the output of said pulse compressing means for rectifying the compressed pulses, (c) amplitude quantizer means connected to the output of said rectifying means for quantizing each rectified pulse into a combination of bits having equal potentials and different time positions, depending on the amplitude of the rectified pulse, each bit representing a different potential level, (d) intervening medium, (e) means operatively associated with said quantizer means for feeding the quantized bits in their proper time positions into said medium, (f) means operatively associated with said medium for receiving the bits from said medium in their respective time positions, (g) decoder means connected to said receiving means for decoding the reproduced bits into amplitude modulated pulses, and (h) expander means connected to said decoder means for expanding the amplitude modulated pulses to the same degree as they were compressed by said pulse compressing means.

2. Pulse code modulation encoding and decoding apparatus, as defined in claim 1, in which the amplitude quantizer means comprises:

(a) a plurality of delay circuits arranged in stages, each having a delay time equal to the time of one bit of the pulse code, (b) means for feeding the rectified pulses from the rectifying means into the first of said delay circuits, (c) means for each of the remaining delay circuits and connected thereto for feeding pulses into said circuit from the preceding delay circuit, (d) comparing means for each delay circuit connected to the feeding means thereof for comparing the potential of the pulse received by that circuit with a predetermined potential, said predetermined potentials for the different delay circuits being arranged in descending order, (e) means for each delay circuit connected to the comparing means thereof and operative only if the incoming pulse has a lower potential than the predetermined potential of that comparing means for passing said incoming pulse unaltered to the next succeeding delay circuit, (f) means for each delay circuit connected to the comparing means thereof and operative only if the incoming pulse has a higher potential than the predetermined potential of that comparing means for passing potential equal to the difference between the incoming potential and said predetermined potential to the next succeeding delay circuit, and (g) common means connected to each comparing means and operative only if the incoming pulse has a higher potential than the predetermined potential of that comparing means for feeding a pulse to the said medium at the time position that the pulse was received by that stage.

3. Pulse code modulation encoding and decoding apparatus, as defined in claim 2, in which each delay circuit comprises:

(a) a first delay line having one end connected to the feeding means, (b) normally open gating means connected to the other end of said first delay line, (c) a second delay line having a delay equal to that of said first delay line and having one end connected to the output of the comparing means, (d) means also connected to the output of said comparing means and to said gating means for closing said gating means if the incoming pulse has a higher potential than the predetermined potential of said comparing means, and (e) means for connecting the output of said gating means and the other end of said second delay line to the next succeeding delay circuit.

4. Pulse code modulation encoding and decoding apparatus, as defined in claim 3, in which the gate-closing means comprises:

(a) a monostable multivibrator circuit adapted to remain in its unstable condition when set in that condition for a period of time less than the time between adjacent amplitude pulses and to produce a potential when in that condition for closing the gating means, and (b) means for setting said multivibrator in its unstable condition when the comparing means detects an incoming pulse of higher potential than the predetermined potential for that comparing means.

5. Pulse code modulation encoding and decoding apparatus, as defined in claim 4, in which the means for feeding the pulse to said medium comprises:

(a) a blocking oscillator adapted to be triggered by the comparing means when the incoming pulse is higher in potential than the predetermined potential of the comparing means.

6. Pulse code modulation encoding and decoding apparatus, as defined in claim 5, in which each comparing means comprises:

(a) a resistor connected between the source of predetermined reference potential and the feeding means for the stage to which the comparing means belongs, (b) a diode connected in the circuit of said resistor and poled to prevent easy current flow from said source, and (c) an output circuit for said comparing means connected to the end of said resistor farthest from said source of reference potential.

7. Pulse code modulation encoding and decoding apparatus comprising:

(a) pulse compressing means for receiving and compressing bipolar amplitude modulated pulses, (b) means connected to the output of said receiving and compressing means for detecting the polarity of a compressed pulse and producing a polarity bit only when the compressed pulse is a given polarity, (c) rectifying means connected to the output of said receiving and compressing means for rectifying the compressed pulses, (d) delaying means connected to the output of said rectifying means for delaying the rectified pulses for a predetermined time, (e) amplitude quantizer means connected to the output of said delaying means for quantizing each delayed pulse into a combination of bits having equal potentials and different time positions depending on the amplitude of the delayed pulse, each bit representing a different potential level, (f) intervening medium for receiving the polarity bit produced by said polarity-detecting means and the quantized bits produced by said amplitude quantizing means in their respective time positions, (g) means connected to said medium for receiving said bits from said medium in their respective time positions, (h) decoder means connected to said receiving means for decoding the reproduced bits into amplitude modulated pulses, (i) an output circuit, (j) means connected to said decoder means and to said receiving means and responsive to said polarity bit for applying the pulses from said decoder means to said output circuit in said given polarity and responsive to the absence of said polarity bit for applying said pulses in the other polarity, and (k) expander means connected to said output circuit for expanding the amplitude modulated pulses to the same degree as they were compressed by said pulse compressing means.

8. Pulse code modulation encoding and decoding apparatus as defined in claim 7, in which the amplitude quantizer means comprises:

(a) a plurality of delay circuits arranged in stages, each having a delay time equal to the time of one bit of the pulse code, (b) means for feeding the rectified pulses from the rectifying means into the first of said delay circuits, (c) means for each of the remaining delay circuits and connected thereto for feeding pulses into said circuit from the preceding delay circuit.

(d) comparing means for each delay circuit connected to the feeding means thereof for comparing the potential of the pulse received by that circuit with a predetermined potential, said predetermined potentials for the different delay circuits being arranged in descending order, (e) means for each delay circuit connected to the comparing means thereof and operative only if the incoming pulse has a lower potential than the predetermined potential of that comparing means for passing said incoming pulse unaltered to the next succeeding delay circuit, (f) means for each delay circuit connected to the comparing means thereof and operative only if the incoming pulse has a higher potential than the predetermined potential of the comparing means for passing a potential equal to the difference between the incoming potential and said predetermined potential to the next succeeding delay circuit, and (g) common means connected to each comparing means and operative only if the incoming pulse has a higher potential than the predetermined potential of that comparing means for feeding a pulse to the said medium at the time position that the pulse was received by that stage.

9. Pulse code modulation encoding and decoding apparatus, as defined in claim 8, in which each delay circuit comprises:

(a) a first delay line having one end connected to the feeding means, (b) normally open gating means connected to the other end of said first delay line, (c) a second delay line having a delay equal to that of said first delay line and having one end connected to the output of the comparing means, (d) means also connected to the output of the comparing means and to said gating means for closing said gating means if the incoming pulse has a higher potential than the predetermined potential of said comparing means, and (e) means for connecting the output of said gating means and the other end of said second delay line to the next succeeding delay circuit.

10. Pulse code modulation encoding and decoding apparatus, as defined in claim 9, in which the gate-closing means comprises:

(a) a monostable multivibrator circuit adapted to remain in its unstable condition when set in that condition for a period of time less than the time between adjacent amplitude pulses and to produce a potential when in that condition for closing the gating means, and (b) means for setting said multivibrator in its unstable condition when the comparing means detects an incoming pulse of higher potential than the predetermined potential for that comparing means.

11. Pulse code modulation encoding and decoding apparatus, as defined in claim 10, in which the means for feeding the pulse to the said medium comprises:

(a) a blocking oscillator for each delay circuit adapted to be triggered by the comparing means when the incoming pulse is higher in potential than the predetermined potential of the comparing means, and (b) means connecting the output of said blocking oscillator to said medium.

12. Pulse code modulation encoding apparatus comprising:

(a) compressing means for receiving and compressing amplitude modulated pulses, (b) rectifying means connected to the output of said compressing means for rectifying the compressed pulses, (c) amplitude quantizer means connected to the output of said rectifying means for quantizing each rectified pulse into a combination of bits having equal potentials and different time positions depending on the amplitude of the rectified pulse, each bit representing a different potential level, (d) utilization means, and (e) means operatively connected with said quantizer means for feeding the quantized bits in their proper time positions into said utilization means.

13. Pulse code modulation encoding apparatus, as defined in claim 12, in which the amplitude quantizer means comprises:
(a) a plurality of delay circuits arranged in stages, each having a delay time equal to the time of one bit of the pulse code,
(b) means for feeding the rectified pulses from the rectifying means into the first of said delay circuits,
(c) means for each of the remaining delay circuits and connected thereto for feeding pulses into said circuit from the preceding delay circuit,
(d) comparing means for each delay circuit connected to the feeding means thereof for comparing the potential of the pulse received by that circuit with a predetermined potential, said predetermined potentials for the different delay circuits being arranged in descending order,
(e) means for each delay circuit connected to the comparing means thereof and operative only if the incoming pulse has a lower potential than the predetermined potential of that comparing means for passing said incoming pulse unaltered to the next succeeding delay circuit,
(f) means for each delay circuit connected to the comparing means thereof and operative only if the incoming pulse has a higher potential than the predetermined potential of that comparing means for passing a potential equal to the difference between the incoming potential and said predetermined potential to the next succeeding delay circuit, and
(g) common means connected to each comparing means and operative only if the incoming pulse has a higher potential than the predetermined potential of that comparing means for feeding a pulse to the utilization means at the time position that the pulse was received at that stage.

14. A pulse code modulation encoding apparatus, as defined in claim 13, in which each delay circuit comprises:
(a) a first delay line having one end connected to the feeding means,
(b) normally open gating means connected to the other end of said first delay line,
(c) a second delay line having a delay equal to that of said first delay line and having one end connected to the output of the comparing means,
(d) means also connected to the output of said comparing means and to said gating means for closing said gating means if the incoming pulse has a higher potential than the predetermined potential of said comparing means, and
(e) means for connecting the output of said gating means and the other end of said second delay line to the next succeeding delay circuit.

15. A pulse code modulation encoding apparatus, as defined in claim 14, in which the gate-closing means comprises:
(a) a monostable multivibrator adapted to remain in its unstable condition when set in that condition for a period of time less than the time between adjacent amplitude pulses and to produce a potential when in that condition for closing the gating means, and
(b) means for setting said multivibrator in its unstable condition when the comparing means detects an incoming pulse of higher potential than the predetermined potential for that comparing means.

16. A pulse code modulation encoding apparatus comprising:
(a) pulse compressing means for receiving and compressing bipolar amplitude modulated pulses,
(b) means connected to the output of said receiving and compressing means for detecting the polarity of a compressed pulse and producing a polarity bit only when the compressed pulse is a given polarity,
(c) full-wave rectifying means connected to the output of said receiving and compressing means for rectifying the compressed pulses,
(d) delaying means connected to the output of said rectifying means for delaying the rectified pulses for a predetermined time,
(e) amplitude quantizer means connected to the output of said delaying means for quantizing each delayed pulse into a combination of bits having equal potentials and different time positions depending on the amplitude of the delayed pulse, each bit representing a different potential level, and
(f) utilization means for receiving the polarity bit produced by said polarity detecting means and the quantized bits produced by said amplitude quantizing means in their respective time positions.

17. A pulse code modulation encoding apparatus, as defined in claim 16, in which the amplitude quantizer means comprises:
(a) a plurality of delay circuits arranged in stages, each having a delay time equal to the time of one bit of the pulse code,
(b) means for feeding the rectified pulses from the rectifying means into the first of said delay circuits,
(c) means for each of the remaining circuits and connected thereto for feeding pulses into said circuit from the preceding delay circuit,
(d) comparing means for each of said delay circuits connected to the feeding means thereof for comparing the potential of the pulse received by that circuit with a predetermined potential, said predetermined potentials for the different delay circuits being arranged in descending order,
(e) means for each delay circuit connected to the comparing means thereof and operative only if the incoming pulse has a lower potential than the predetermined potential of that comparing means for passing said incoming pulse unaltered to the next succeeding delay circuit,
(f) means for each delay circuit connected to the comparing means thereof and operative only if the incoming pulse has a higher potential than the predetermined potential of the comparing means for passing a potential equal to the difference between the incoming potential and said predetermined potential to the next succeeding delay circuit, and
(g) common means connected to each comparing means and operative only if the incoming pulse has a higher potential than the predetermined potential of that comparing means for feeding a pulse to the utilization means at the time position that the pulse was received by that stage.

18. A pulse code modulation encoding apparatus, as defined in claim 17, in which each delay circuit comprises:
(a) a first delay line having one end connected to the feeding means,
(b) normally open gating means connected to the other end of said first delay line,
(c) a second delay line having a delay equal to that of said first delay line and having one end connected to the output of the comparing means,
(d) means also connected to the output of the comparing means and to the gating means for closing the gating means if the incoming pulse has a higher potential than the predetermined potential of said comparing means, and
(e) means for connecting the output of said gating means and the other end of said second delay line to the next succeeding delay circuit.

19. A pulse code modulation decoding apparatus comprising:
(a) a delay line having a plurality of equally spaced taps thereon, the time delay between adjacent taps being equal to the time delay between bits of a pulse code, (b) means for feeding a pulse code modulation signal into one end of said delay line,
(c) means for producing a timing pulse at a time when the bits of a received pulse code are aligned with their corresponding taps in said delay line,
(d) a plurality of storage devices, there being one for each tap of said delay line,
(e) first gating means for each storage device connecting said device to its corresponding tap on said delay line,
(f) means connected to said timing-pulse-producing means and to said first gating means for simultaneously opening said first gating means at the time of said timing pulse to store the value of each bit of the pulse code in its particular storage device,
(g) means connected to each of said storage devices for producing a predetermined output potential for said device different from that of any other device,
(h) an output circuit,
(i) second gating means between said storage devices and said output circuit, and
(j) means connected to said timing-pulse-producing means for opening said second gating means a predetermined time after each timing pulse is produced.

20. A pulse code modulation decoding apparatus comprising:
(a) a delay line having a plurality of equally spaced taps thereon, the time delay between adjacent taps being equal to the time delay between bits of a pulse code, there being one bit in said code to represent a given polarity,
(b) means for feeding a pulse code modulation signal into one end of said delay line,
(c) means for producing a timing pulse at a time when the bits of a received pulse code are aligned with their corresponding taps in said delay line,
(d) a plurality of storage devices, there being one for each tap in said delay line, the storage device for said polarity bit having a first output adapted to be energized only when a polarity bit is stored in said device and a second output adapted to be energized only when no polarity bit is stored in said device,
(e) a plurality of AND gates, there being one for each tap on said delay line,
(f) means for connecting one input of each AND gate to its corresponding tap on said delay line,
(g) means for connecting another input of each AND gate to said timing-pulse-producing means, whereby each AND gate will open at the time of said timing pulse if a code bit appears at that time at the corresponding tap on said delay line,
(h) means connected to each of said storage devices for producing a predetermined output potential for said device different from that of any other device when a bit enters said storage device through the corresponding AND gate,
(i) an output circuit,
(j) a first output AND gate having three inputs,
(k) means for connecting a first input of said first output AND gate to the outputs of all the storage devices except that connected to the tap on said delay line for said polarity bit,
(l) means for connecting a second input of said first output AND gate to said first output of said storage device for the polarity bit,
(m) a second output AND gate having three inputs,
(n) means for connecting a first input of said second output AND gate to the outputs of all the storage devices except that connected to the tap on said delay line for said polarity bit,
(o) means for connecting a second input of said second output AND gate to the first output of said storage device for the polarity bit,
(p) delaying means connected to said timing-pulse-producing means for producing a potential at a predetermined time after the occurrence of a timing pulse,
(q) means for connecting the output of said delaying means to a third input of each of said first and second output AND gates,
(r) means for connecting the output of said first output AND gate to said output circuit,
(s) an inverter, and
(t) means for connecting said inverter between the output of said second output AND gate and said output circuit.

References Cited by the Examiner

UNITED STATES PATENTS

| | | | |
|---|---|---|---|
| 2,569,927 | 10/1951 | Gloess et al. | 332—1 |
| 2,592,308 | 4/1952 | Meacham | 179—15 |
| 2,770,777 | 11/1956 | Feissel | 332—1 |
| 3,176,224 | 3/1965 | Lampke | 325—38 |

DAVID G. REDINBAUGH, *Primary Examiner.*

J. T. STRATMAN, *Assistant Examiner.*